United States Patent
Osaka

(10) Patent No.: US 9,803,536 B2
(45) Date of Patent: Oct. 31, 2017

(54) AUXILIARY CHAMBER TYPE INTERNAL COMBUSTION ENGINE

(71) Applicant: DENSO CORPORATION, Kariya, Aichi-pref. (JP)

(72) Inventor: Jun Osaka, Chiryu (JP)

(73) Assignee: DENSO CORPORATION, Kariya (JP)

( * ) Notice: Subject to any disclaimer, the term of this patent is extended or adjusted under 35 U.S.C. 154(b) by 231 days.

(21) Appl. No.: 14/539,340

(22) Filed: Nov. 12, 2014

(65) Prior Publication Data

US 2015/0128898 A1    May 14, 2015

(30) Foreign Application Priority Data

Nov. 13, 2013 (JP) .................................. 2013-234626

(51) Int. Cl.
*F02B 19/08* (2006.01)
*F02B 19/16* (2006.01)
*F02B 19/10* (2006.01)

(52) U.S. Cl.
CPC .............. *F02B 19/08* (2013.01); *F02B 19/10* (2013.01); *F02B 19/108* (2013.01); *F02B 19/1014* (2013.01); *F02B 19/1023* (2013.01); *F02B 19/1061* (2013.01); *F02B 19/165* (2013.01); *Y02T 10/125* (2013.01)

(58) Field of Classification Search
CPC ...... F02B 19/18; F02B 19/165; F02B 19/095; F02B 19/08; F02B 19/10; F02B 19/1061; F02B 19/1023; F02B 19/1014; F02B 19/12; F02B 19/02; F02B 19/1004;

(Continued)

(56) References Cited

U.S. PATENT DOCUMENTS 2,925,807 A * 2/1960 Herrmann ............... F02B 19/08
                                                                123/262
3,102,521 A * 9/1963 Slemmons ............. F02M 69/00
                                                                123/263

(Continued)

FOREIGN PATENT DOCUMENTS

JP    S55-123311    9/1980
JP    H06-108849    4/1994

(Continued)

OTHER PUBLICATIONS

Japanese Patent Office, "Notification of Reason(s) for Refusal," (2 pages) issued in connection with Japanese Patent Application No. 2013-234626, dated Aug. 4, 2015, with its English language Translation (2 pages).

*Primary Examiner* — Lindsay Low
*Assistant Examiner* — George Jin
(74) *Attorney, Agent, or Firm* — Nixon & Vanderhye P.C.

(57) ABSTRACT

Auxiliary chamber type internal combustion engine has a main combustion chamber and an auxiliary chamber having an injection port through which the main combustion chamber communicates. The auxiliary chamber has a passage sectional area which is smoothly decreased toward the injection port. Further, the engine has a fuel injector injecting a fuel into the auxiliary chamber; an ignition plug igniting the fuel in the auxiliary chamber; and a swirl generating portion swirling a gas in the auxiliary chamber. The swirl generating portion swirls only the gas flowing into the auxiliary chamber from the main combustion chamber.

5 Claims, 6 Drawing Sheets

(58) Field of Classification Search
CPC .... F02B 19/1071; F02B 19/108; F02B 19/1085; F02D 41/38
USPC .......................................... 123/274, 275, 295
See application file for complete search history.

(56) References Cited

U.S. PATENT DOCUMENTS

| | | | | |
|---|---|---|---|---|
| 4,066,045 A * | 1/1978 | Suzuki | F02B 19/08 | 123/260 |
| 4,149,495 A * | 4/1979 | Miura | F02B 19/08 | 123/260 |
| 4,178,903 A * | 12/1979 | Yanagihara | F02B 19/1085 | 123/259 |
| 4,232,638 A * | 11/1980 | Takahashi | F02B 19/1085 | 123/260 |
| 4,250,852 A * | 2/1981 | Abulkasim ogly Kerimov | F02B 19/108 | 123/260 |
| 4,300,497 A * | 11/1981 | Webber | F02B 19/02 | 123/254 |
| 4,398,513 A * | 8/1983 | Tanasawa | F02B 19/08 | 123/255 |
| 4,465,032 A * | 8/1984 | Artman | F02B 19/1028 | 123/263 |
| 4,467,759 A * | 8/1984 | Artman | F02B 19/1028 | 123/260 |
| 4,577,600 A * | 3/1986 | Morita | F02B 19/165 | 123/254 |
| 4,635,598 A * | 1/1987 | Tanaka | F02B 19/08 | 123/261 |
| 4,765,293 A * | 8/1988 | Gonzalez | F02B 19/1004 | 123/259 |
| 4,784,098 A * | 11/1988 | Artman | F02B 19/12 | 123/262 |
| 5,603,298 A | 2/1997 | Kawamura | | |
| 5,829,407 A | 11/1998 | Watson et al. | | |
| 8,544,443 B2 * | 10/2013 | Taliaferro | F02B 19/1009 | 123/254 |
| 2006/0130804 A1 * | 6/2006 | Teraji | F02B 19/12 | 123/256 |
| 2008/0196690 A1 | 8/2008 | Hotta et al. | | |
| 2010/0319655 A1 * | 12/2010 | McClendon | F02B 19/08 | 123/279 |
| 2013/0233273 A1 * | 9/2013 | Redtenbacher | F02B 19/1014 | 123/253 |
| 2015/0034043 A1 * | 2/2015 | Kuwayama | F02B 19/14 | 123/275 |

FOREIGN PATENT DOCUMENTS

| | | |
|---|---|---|
| JP | A-H09-013971 | 1/1997 |
| JP | 2002-266645 | 9/2002 |
| JP | A-2011-038465 | 2/2011 |

* cited by examiner

AUXILIARY CHAMBER TYPE INTERNAL COMBUSTION ENGINE

CROSS-REFERENCE TO RELATED APPLICATION

This application is based on Japanese Patent Application No. 2013-234626 filed on Nov. 13, 2013, the disclosure of which is incorporated herein by reference.

TECHNICAL FIELD

The present disclosure relates to an auxiliary chamber type internal combustion engine having a main combustion chamber and an auxiliary chamber.

BACKGROUND

JP-2011-38465A shows an internal combustion engine having a main combustion chamber and an auxiliary chamber. A spring member is disposed in the auxiliary chamber to generate a swirl flow. An air flowing into the auxiliary chamber from the main combustion chamber and a fuel supplied to the auxiliary chamber are homogeneously mixed, whereby an ignitability of the fuel in the auxiliary chamber can be stabilized.

However, it is still necessary to improve a spread of a flame jet which is injected from the auxiliary chamber to the main combustion chamber.

SUMMARY

It is an object of the present disclosure to provide an auxiliary chamber type internal combustion engine which can spread a flame jet promptly in a main combustion chamber.

According to the present disclosure, an auxiliary chamber type internal combustion engine has a main combustion chamber, and an auxiliary chamber having an injection port through which the main combustion chamber communicates. The auxiliary chamber has a passage sectional area which is smoothly decreased toward the injection port. The auxiliary chamber type internal combustion engine further has a fuel injector injecting a fuel into the auxiliary chamber; an ignition plug igniting the fuel in the auxiliary chamber; and a swirl generating portion swirling a gas in the auxiliary chamber.

According to the above configuration, a fuel is supplied into the auxiliary chamber, and is ignited by the ignition plug. Since the air in the auxiliary chamber is swirled by the swirl generating portion, the fuel ignited in the auxiliary chamber becomes the swirling flame jet. The passage sectional area of the auxiliary chamber is smoothly decreased toward the injection port. Thus, the flow direction of the flame jet does not change rapidly in the auxiliary chamber. A flow velocity of the flame jet is increased at the injection port. Therefore, the swirling flame jet is injected from the injection port to the main combustion chamber without causing a vortex breakdown. Then, the flow velocity of the swirling flame jet is decreased in the main combustion chamber, so that a vortex breakdown is generated and the flame jet is rapidly spread in the main combustion chamber. As a result, the fuel combustion in the main combustion chamber can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
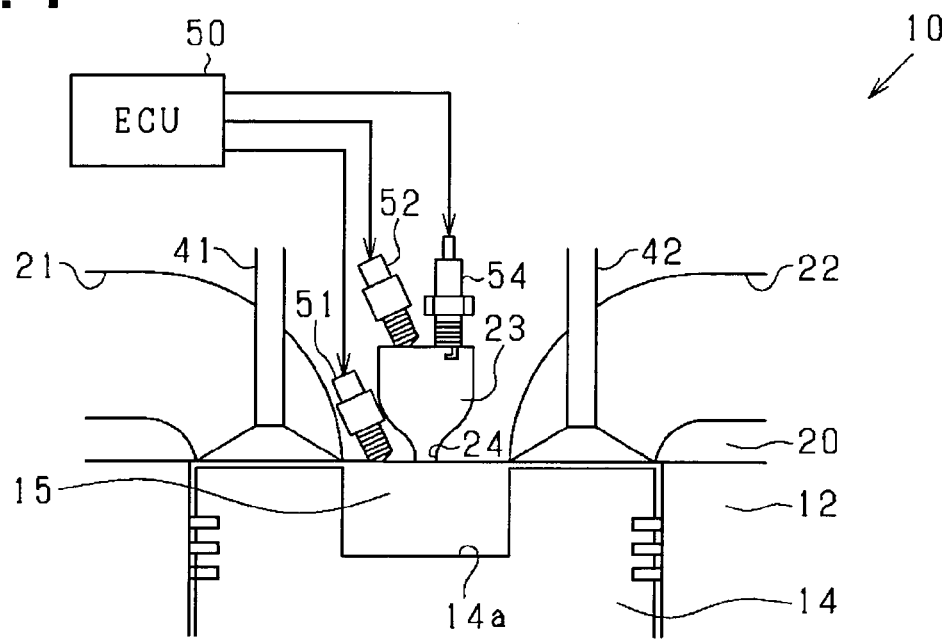
FIG. 1 is a schematic chart showing an auxiliary chamber type internal combustion engine.

A first embodiment of the present invention will now be described with reference to the accompanying drawings. FIG. 1 is a schematic chart illustrating an auxiliary chamber type internal combustion engine 10 which uses gas fuel.

The internal combustion engine 10 has a cylinder block 12, a piston 14, a cylinder head 20, an intake valve 41, an exhaust valve 42, a main fuel injector 51, a second sub fuel injector 52, an ignition plug 54, and an Electric Control Unit (ECU) 50.

The cylinder block 12, the piston 14 and the cylinder head 20 define a main combustion chamber 15. The cylinder head 20 is provided with an intake port 21 and an exhaust port 22. The air is intaken into the main combustion chamber 15 from an intake port 21 through an intake valve 41. The exhaust gas is discharged from the main combustion chamber 15 to an exhaust port 22 through an exhaust valve 42. The intake valve 41 and the exhaust valve 42 are driven by a cam shaft (not shown).

The fuel pressurized by a fuel pump (not shown) is supplied to the main fuel injector 51. The main fuel injector 51 is provided to the cylinder head 20 in such a manner as to confront a center of the main combustion chamber 15. During a compression stroke, the main fuel injector 51 injects the gas fuel toward a head of the piston 14. The main fuel injector 51 is controlled by the ECU 50.

An auxiliary chamber 23 is defined in the cylinder head 20 above the main combustion chamber 15. A volume of the auxiliary chamber 23 is smaller than that of the main combustion chamber 15. The main combustion chamber 15 and the auxiliary chamber 23 communicate with each other through an injection port 24 which has a circular cross section. The second sub fuel injector 52 and the ignition plug 54 are provided to the cylinder head 20 adjacent to the auxiliary chamber 23. The second sub fuel injector 52 supplies the fuel into the auxiliary chamber 23 through an injection nozzle 52a. The ignition plug 54 ignites the air-fuel mixture in the auxiliary chamber 23.

Although the fuel supplied to the auxiliary chamber 23 may be the same as the gas fuel supplied to the main combustion chamber 15, it is preferable that the fuel supplied to the auxiliary chamber 23 has higher combustion velocity than that of the gas fuel supplied to the main combustion chamber 15. Specifically, a high octane value liquid fuel which is rich in an aromatic compound or a gas fuel which is rich in hydrogen is preferable.

A cavity 14a is formed on a top surface of the piston 14. The cavity 14a confronts the injection port 24. The cavity 14a is formed cylindrically and its axis line agrees with an axis line of the injection port 24. A diameter and a depth of the cavity 14a are determined based on a compression ratio of the internal combustion engine 10.

The ECU 50 is a microcomputer having a CPU, a ROM, a RAM and an input/output interface. The ECU 50 receives output signals from various sensors, such as a crank angle sensor, a coolant temperature sensor, and an accelerator position sensor. Then, the ECU 50 controls the main fuel injector 51, the second sub fuel injector 52, and ignition-plug 54 based on the output signals.

Figure 2:
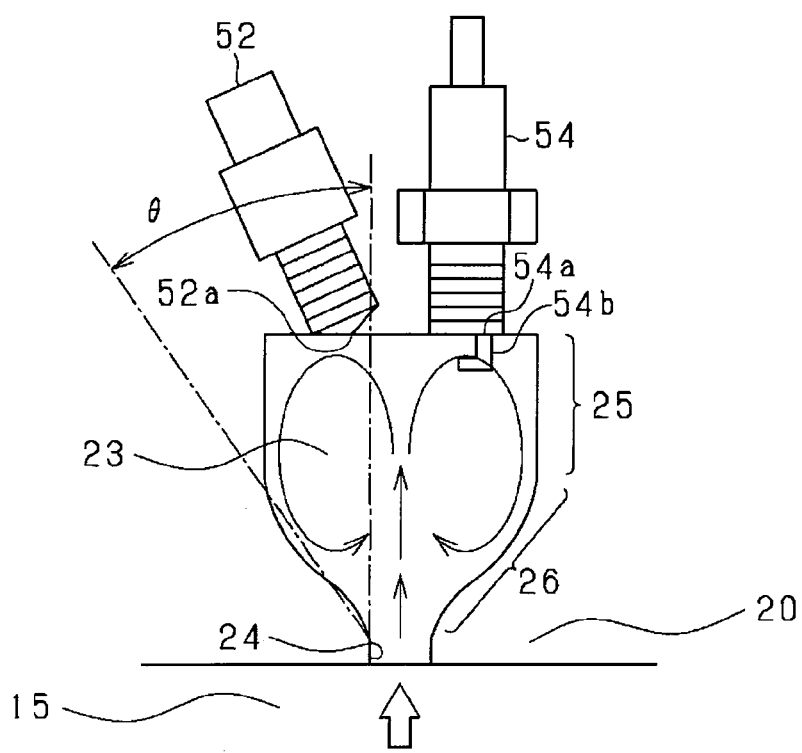
FIG. 2 is a schematic chart showing an auxiliary chamber and its vicinity according to a first embodiment.
Figure 3:
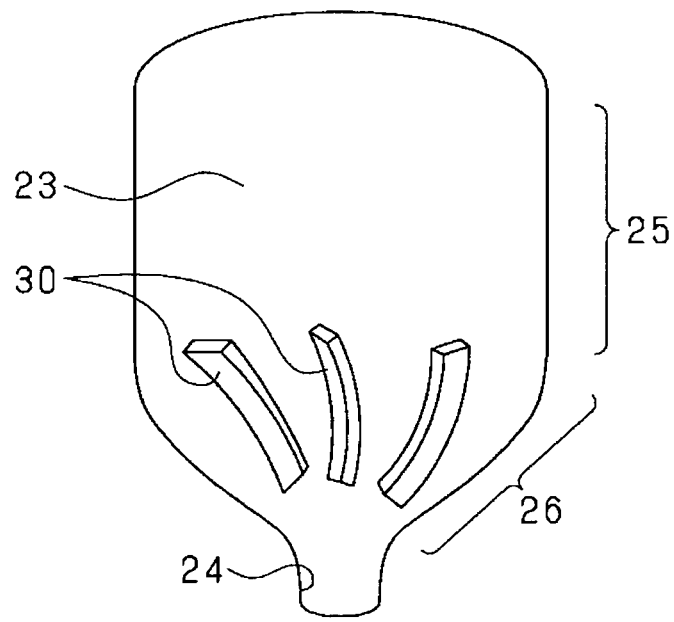
FIG. 3 is a schematic chart showing vanes in the auxiliary chamber.

Next, with reference to FIGS. 2 and 3, a configuration of the auxiliary chamber 23 will be explained in detail. FIG. 2 is a schematic chart showing the auxiliary chamber 23 and its vicinity. FIG. 3 is a schematic chart showing the auxiliary chamber 23 and vanes 30. It should be noted that the vanes 30 are not illustrated in FIG. 2.

The auxiliary chamber 23 is comprised of a cylindrical portion 25 and a circular cone portion 26.

An axis line of the cylindrical portion 25 agrees with the axis line of the injection port 24. The second sub fuel injector 52 and the ignition plug 54 are provided to the cylinder head 20 in such a manner as to confront the cylindrical portion 25 of the auxiliary chamber 23. The ignition plug 54 has a grounding electrode 54b which extends from a specified position 54a to a center of the ignition plug 54. The ignition plug 54 is arranged in such a manner that a distance between the injection nozzle 52a and the specified position 54a becomes longest. The cylindrical portion 25 is connected to the circular cone portion 26.

An axis line of the circular cone portion 26 agrees with the axis line of the injection port 24 and the axis line of the cylindrical portion 25. A top part of the circular cone portion 26 is connected to the injection port 24.

An inner diameter of the circular cone portion 26 is gradually decreased from a connecting portion with the cylindrical portion 25 to the connecting portion with the injection port 24. That is, a passage sectional area of the auxiliary chamber 23 is smoothly decreased from the cylindrical portion 25 to the injection port 24. An inner surface of the injection port 24 and an inner surface of the circular cone portion 26, which are shown by dashed lines in FIG. 2, cross at an angle θ. The angle θ is defined in such a manner that the air flowing into the auxiliary chamber 23 from the main combustion chamber 15 separates from the inner surface of the circular cone portion 26 during a compression stroke of the engine 10. Specifically, the angle θ is 12°~60°.

As shown in FIG. 3, a plurality of vanes 30 is provided on the inner surface of the circular cone portion 26. Each of the vanes 30 is a blade spirally extending from the bottom of the circular cone portion 26 to the top of the circular cone portion 26. Each of vanes 30 protrudes from an inner surface of the circular cone portion 26 inwardly. Each of the vanes 30 swirls the air flowing to the injection port 24 along the inner surface of the auxiliary chamber 23.

A combustion of the internal combustion engine 10 will be described hereinafter.

In an intake stroke, the intake valve 41 is opened and the air is intaken into the main combustion chamber 15 through the intake port 21.

Then, in a compression stroke, the intake valve 41 is closed and the air is compressed by the piston 14. The fuel is injected towards the cavity 14a of the piston 14 from the main fuel injector 51. At this time, as shown by arrows in FIG. 2, the air is introduced into the auxiliary chamber 23 through an injection port 24 from the main combustion chamber 15.

When the air swirls from the main combustion chamber 15 to the auxiliary chamber 23, it is likely that the flame jet may not swirl from the auxiliary chamber 23 to the main combustion chamber 15 due to the vanes 30. According to the present embodiment, as shown FIG. 3, the vanes 30 are formed on the circular cone portion 26 from which the air separates. Thus, the air flowing into the auxiliary chamber 23 from the main combustion chamber 15 is not swirled.

Then, the second sub fuel injector 52 injects the fuel into the auxiliary chamber 23. The injected fuel is mixed with the air which flows into the auxiliary chamber 23 from the main combustion chamber 15. At this time, the air flow shown by arrows in FIG. 2 accelerates the mixture of air and fuel.

Then, the ignition plug 54 ignites the air-fuel mixture. The air-fuel mixture is combusted to generate a flame jet to the injection port 24. Since the ignition plug 54 is arranged in such a manner that the distance between the injection nozzle 52a and the specified position 54a becomes longest, the air-fuel mixture can be combusted near the center of the auxiliary chamber 23 relative to the specified position 54a. The flame jet flowing along an inner surface of the auxiliary chamber 23 is swirled by the vanes 30. At this time, since the air flowing into the auxiliary chamber 23 from the main combustion chamber 15 is not swirled, the flame jet is swirled by the vanes 30 without any trouble. If the air flowing into the auxiliary chamber 23 from the main combustion chamber 15 is swirled by the vanes 30, the swirling directions are opposite between the air and the flame jet.

The passage sectional area of the circular cone portion 26 is smoothly decreased toward the injection port 24. Thus, the flow direction of the flame jet does not change rapidly in the auxiliary chamber 23. Since the passage sectional area of the circular cone portion 26 is smoothly decreased, the flow velocity of the flame jet is increased at the injection port 24. Therefore, the swirling flame jet is injected from the injection port 24 to the main combustion chamber 15 without causing a vortex breakdown. Generally, since the pressure is relatively low at a center of a swirling flow, the vortex breakdown is easily caused when the flow velocity is decreased.

Then, the flow velocity of the swirling flame jet is decreased in the main combustion chamber 15, so that a vortex breakdown is generated and the flame jet is rapidly spread in the main combustion chamber 15. The cavity 14a confronting the injection port 24 is formed on a top surface of the piston 14. For this reason, it can be restricted that the flame jet injected into the main combustion chamber 15 from the auxiliary chamber 23 collides with the piston 14.

As described above, the flame jet injected into the main combustion chamber 15 from the auxiliary chamber 23 can be promptly spread in the main combustion chamber 15 by using of its vortex breakdown. As a result, without depending on flame propagation, the air-fuel mixture injected by the main fuel injector 51 can be combusted promptly. The fuel combustion in the main combustion chamber 15 is improved and a heat efficiency of the internal combustion engine 10 is enhanced. Furthermore, even when a premixing of the air and the fuel injected by the main fuel injector 51 is insufficient, the air-fuel mixture is ignited by the flame jet. As a result, the fuel consumption performance of the internal combustion engine 10 can be raised, and a discharge of nitrogen oxides can be suppressed.

According to the above embodiment, following advantages can be obtained.

Since the air in the auxiliary chamber 23 is swirled by the vanes 30, the fuel ignited in the auxiliary chamber 23 becomes the swirling flame jet. The passage sectional area of the circular cone portion 26 is smoothly decreased toward the injection port 24. Therefore, the swirling flame jet is injected from the injection port 24 to the main combustion chamber 15 without causing a vortex breakdown. Then, the flow velocity of the swirling flame jet is decreased in the main combustion chamber 15, so that a vortex breakdown is generated and the flame jet is rapidly spread in the main combustion chamber 15. As a result, the fuel combustion in the main combustion chamber 15 can be improved.

The air flowing into the auxiliary chamber 23 from the main combustion chamber 15 is not swirled. Thus, the swirling flame jet is surely generated.

The vanes 30 are formed on the circular cone portion 26 from which the air separates. Thus, the air flowing into the auxiliary chamber 23 from the main combustion chamber 15 is separated from the inner surface of the circular cone portion 26, so that the air is not swirled. Meanwhile, the vanes 30 swirl the flame jet flowing into the injection port 24 along an inner surface of the auxiliary chamber 23. Therefore, the flame jet flowing into the main combustion chamber 15 from the auxiliary chamber 23 is surely swirled by the vanes 30.

The cavity 14a confronting the injection port 24 is formed on a top surface of the piston 14. For this reason, it can be restricted that the flame jet injected into the main combustion chamber 15 from the auxiliary chamber 23 collides with the piston 14. It is expedited that the flame jet is spread in the main combustion chamber 15 due to the vortex breakdown.

The above-mentioned embodiment may be modified as follows.

Figure 4:
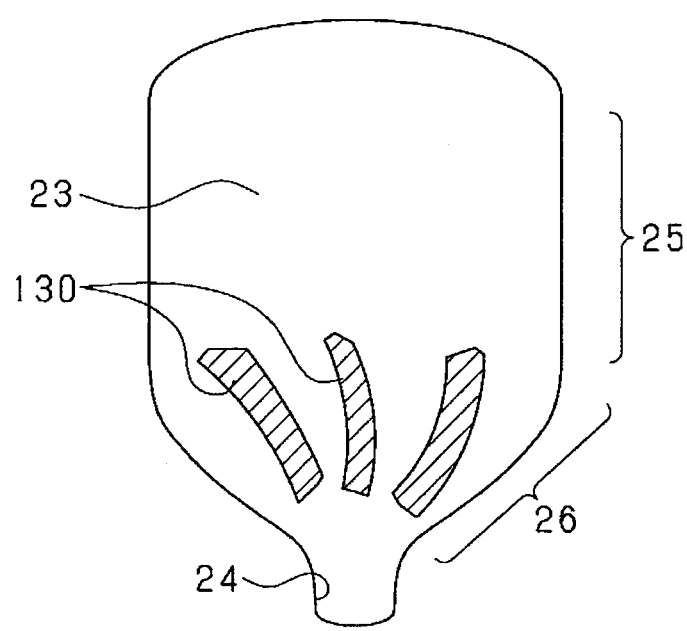
FIG. 4 is a schematic chart showing grooves in the auxiliary chamber.

As shown in FIG. 4, instead of vanes, a plurality of grooves 130 may be formed on the inner surface of the circular cone portion 26 of the auxiliary chamber 23. In FIG. 4, the grooves are indicated with hatching for explaining easily. Each of the grooves 130 is spirally extending from the bottom of the circular cone portion 26 to the top of the circular cone portion 26. Each of the grooves 130 swirls the air flowing to the injection port 24 along the inner surface of the auxiliary chamber 23. The air flowing into the auxiliary chamber 23 from the main combustion chamber 15 is not swirled. Also in the above configuration, the same advantages as those in first embodiment can be obtained.

Second Embodiment

Hereafter, a second embodiment will be described. In the second embodiment, a first sub fuel injector 152 injects a swirling fuel into the auxiliary chamber 23. In the second embodiment, the same parts and components as those in the first embodiment are indicated with the same reference numerals and the same descriptions will not be reiterated.

Figure 5:
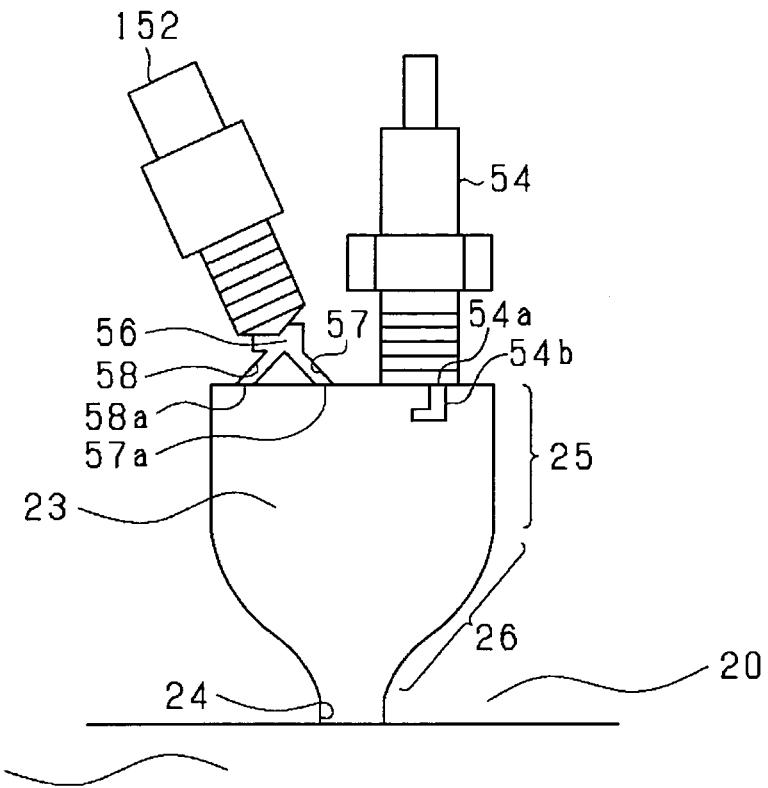
FIG. 5 is a schematic chart showing an auxiliary chamber and its vicinity according to a second embodiment.

FIG. 5 is a schematic chart showing the auxiliary chamber 23 and its vicinity.

The cylinder head 20 has two injection passages 57, 58 and a confluent portion 56 at an upper end of the cylindrical portion 25. Each of the injection passages 57, 58 communicates with the cylindrical portion 25 at its opening end 57a, 58a. The ignition plug 54 is arranged in such a manner that a distance between the opening end 58a and the specified position 54a becomes longest. The injection passages 57, 58 are fluidly connected with each other at the confluent portion 56. The first sub fuel injector 152 is provided to the cylinder head 20 in such a manner as to confront the confluent portion 56. The first sub fuel injector 152 (first fuel supply valve) has the same configuration as the above second sub fuel injector 52 in the first embodiment.

Figure 6:
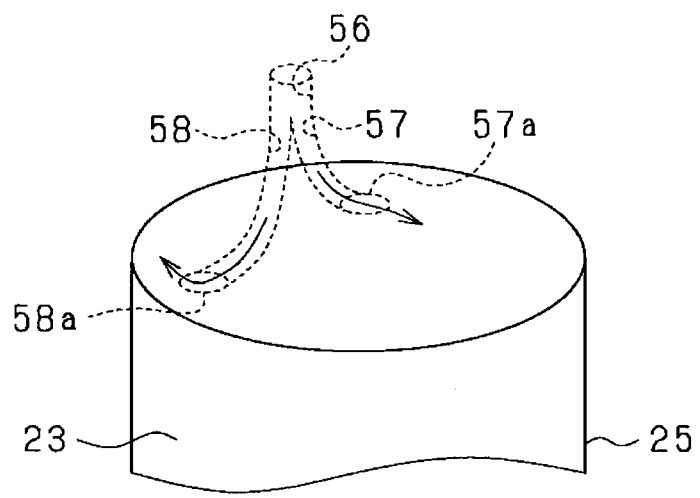
FIG. 6 is a perspective chart schematically showing an injection passage and a confluent portion.

FIG. 6 is a perspective chart schematically showing the injection passages 57, 58 and the confluent portion 56.

The confluent portion 56 is positioned above the auxiliary chamber 23. The injection passages 57, 58 extend from the confluent portion 56 spirally relative to the cylindrical portion 25, and are fluidly connected to the cylindrical portion 25. The fuel is swirled by the first sub fuel injector 152, the confluent portion 56 and the injection passages 57, 58.

Next, the combustion cycle of the internal combustion engine 10 in present embodiment will be explained.

In a compression stroke, the air is introduced into the auxiliary chamber 23 through an injection port 24 from the main combustion chamber 15.

Then, the first sub fuel injector 152 injects the fuel into the confluent portion 56. The injected fuel in the confluent portion 56 flows into the injection passages 57, 58. The fuel is injected into the cylindrical portion 25 spirally from the opening ends 57a, 58a. Thus, the air in the auxiliary chamber 23 is swirled by the injected fuel.

The first sub fuel injector 152 may inject the fuel before or after the main fuel injector 51 injects the fuel. In the case that the first sub fuel injector 152 injects the fuel before the main fuel injector 51 injects the fuel, the air in the auxiliary chamber 23 is swirled and then introduced into the auxiliary chamber 23 from the main combustion chamber 15. Since the air flowing into the auxiliary chamber 23 from the main combustion chamber 15 is not swirled, the swirl of the air in the auxiliary chamber 23 is not weaken. In the case that the first sub fuel injector 152 injects the fuel after the main fuel injector 51 injects the fuel, the air is introduced into the auxiliary chamber 23 from the main combustion chamber 15, and then swirled in the auxiliary chamber 23. At this case, the air flow shown by arrows in FIG. 2 accelerates the mixture of air and fuel.

Then, the ignition plug 54 ignites the air-fuel mixture in the auxiliary chamber 23. Since the ignition plug 54 is arranged in such a manner that the distance between the opening ends 57a, 58a and the specified position 54a becomes longest, the air-fuel mixture can be combusted near the center of the auxiliary chamber 23 relative to the specified position 54a. The air-fuel mixture is combusted to generate a flame jet to the injection port 24. The passage sectional area of the circular cone portion 26 is smoothly decreased toward the injection port 24. Thus, the flow direction of the flame jet does not change rapidly in the auxiliary chamber 23. Since the passage sectional area of the circular cone portion 26 is smoothly decreased, the flow velocity of the flame jet is increased at the injection port 24. Therefore, the swirling flame jet is injected from the injection port 24 to the main combustion chamber 15 without causing a vortex breakdown.

According to the above embodiment, following advantages can be obtained.

The air in the auxiliary chamber 23 is swirled by the first sub fuel injector 152, the confluent portion 56, and the injection passages 57, 58. Thus, the air in the auxiliary chamber 23 can be swirled without providing vanes or grooves.

The above-mentioned embodiment may be modified as follows. The same parts and components as those in the second embodiment are indicated with the same reference numerals and the same descriptions will not be reiterated.

Figure 7:
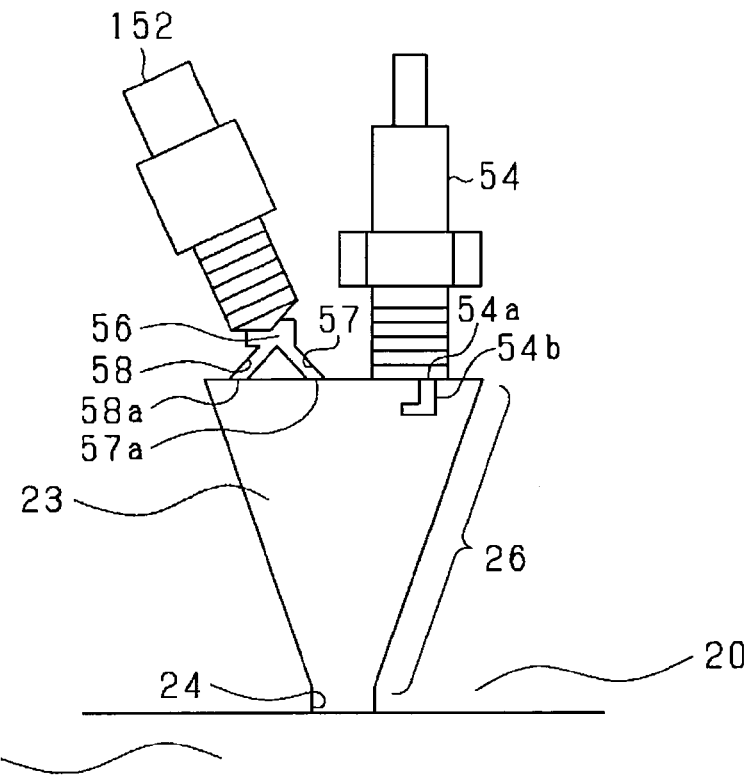
FIG. 7 is a schematic chart showing a modification of the auxiliary chamber.

As shown in FIG. 7, the auxiliary chamber 23 can be defined only by the circular cone portion 26 without the cylindrical portion. Since no vane is formed on the circular cone portion 26, the gas flowing into the auxiliary chamber 23 from the main combustion chamber 15 is not swirled. Therefore, the angle θ between the inner surface of the injection port 24 and the inner surface of the circular cone portion 26 may be about 12° or less. The angle θ is defined in such a manner that the air flowing into the auxiliary chamber 23 from the main combustion chamber 15 does not separate from the inner surface of the circular cone portion 26 during a compression stroke of the engine 10.

In FIG. 5, a plurality of vanes may be provided on the circular cone portion 26. The flame jet flowing into the main combustion chamber 15 from the auxiliary chamber 23 is surely swirled by the first sub fuel injector 152, the confluent portion 56, the injection passages 57 and 58 and the vanes.

Third Embodiment

Hereafter, a third embodiment will be described. In the third embodiment, the same parts and components as those in the first embodiment are indicated with the same reference numerals and the same descriptions will not be reiterated.

Figure 8:
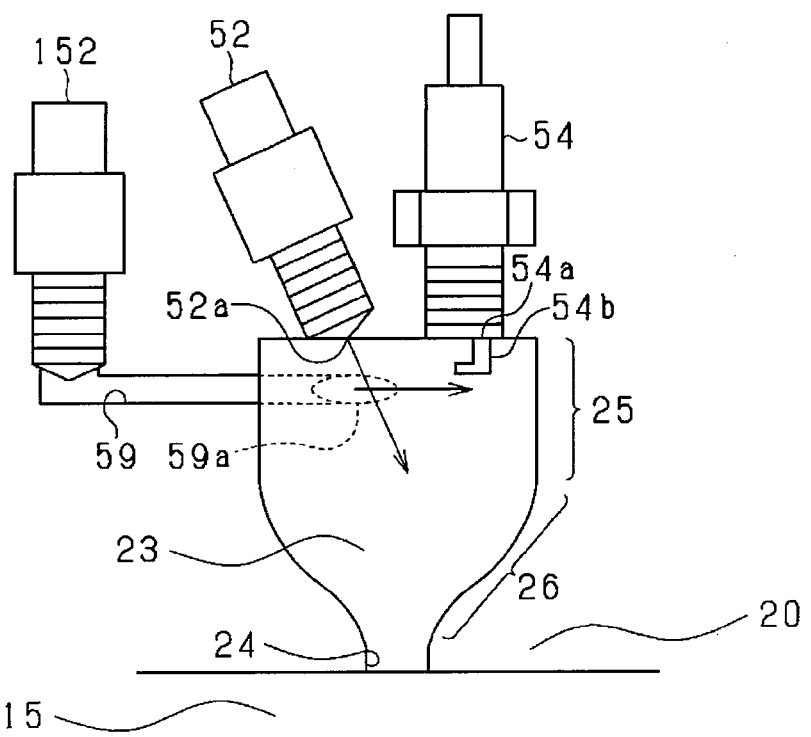
FIG. 8 is a schematic chart showing an auxiliary chamber and its vicinity according to a third embodiment.
Figure 9:
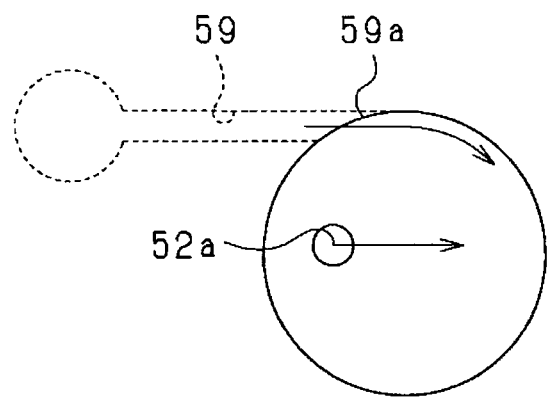
FIG. 9 is a schematic chart showing an injection passage.

FIG. 8 is a schematic chart showing the auxiliary chamber 23 and its vicinity. FIG. 9 is a schematic chart showing an injection passage 59.

The cylinder head 20 has an injection passage 59 at a side of the cylindrical portion 25. The injection passage 59 communicates with the cylindrical portion 25 tangentially at its opening end 59a. The ignition plug 54 is arranged in such a manner that a distance between the injection nozzle 52a and the opening end 59a becomes longest. The first sub fuel injector 152 is provided to the cylinder head 20 in such a manner as to confront the injection passage 59. The first sub fuel injector 152 (first fuel supply valve) has the same configuration as the above second sub fuel injector 52 in the first embodiment. The first sub fuel injector 152 injects the fuel into the injection passage 59.

Moreover, the injection nozzle 52a of the second sub fuel injector 52 (second fuel supply valve) confronts the cylindrical portion 25. The second sub fuel injector 52 supplies the fuel into the auxiliary chamber 23, as shown by arrows in FIGS. 8 and 9. The ECU 50 controls a fuel-injection rate between the first sub fuel injector 152 and the second sub fuel injector 52 based on the operational state of the internal combustion engine 10. The fuel is swirled by the first sub fuel injector 152, the injection passage 59 and the ECU 50.

Next, the combustion cycle of the internal combustion engine 10 in present embodiment will be explained.

In a compression stroke, the air is introduced into the auxiliary chamber 23 through an injection port 24 from the main combustion chamber 15. Since no vane is formed on the circular cone portion 26, the air flowing into the auxiliary chamber 23 from the main combustion chamber 15 is not swirled.

Then, the first sub fuel injector 152 injects the fuel into the injection passage 59. The injected fuel in the injection passage 59 flows through the injection passage 59. The fuel is injected from the opening end 59a in a tangential direction of a cylindrical portion 25, as shown by the arrow. Since the injected fuel flows along the inner circumferential surface of the cylindrical portion 25, the air in the auxiliary chamber 23 is swirled by the injected fuel. Meanwhile, the fuel injected by the second sub fuel injector 52 does not swirl the air in the auxiliary chamber 23. The ECU 50 controls a fuel-injection rate between the first sub fuel injector 152 and the second sub fuel injector 52, whereby a swirl intensity of the air in the auxiliary chamber 23 is adjusted. The sub fuel injectors 152, 52 may inject the fuel before or after the main fuel injector 51 injects the fuel.

Then, the ignition plug 54 ignites the air-fuel mixture in the auxiliary chamber 23. Since the ignition plug 54 is arranged in such a manner that the distance between the injection nozzle 52a and the opening end 59a becomes longest, the air-fuel mixture can be combusted near the center of the auxiliary chamber 23 relative to the specified position 54a. The air-fuel mixture is combusted to generate a flame jet to the injection port 24. The passage sectional area of the circular cone portion 26 is smoothly decreased toward the injection port 24. Therefore, the swirling flame jet is injected from the injection port 24 to the main combustion chamber 15 without causing a vortex breakdown.

According to the above embodiment, following advantages can be obtained.

The air in the auxiliary chamber 23 is swirled by the first sub fuel injector 152 and the injection passage 59. Thus, the air in the auxiliary chamber 23 can be swirled without providing vanes or grooves.

The first sub fuel injector 152 injects the fuel into the auxiliary chamber 23, whereby the air in the auxiliary chamber 23 is swirled. Meanwhile, when it is unnecessary to swirl the air in the auxiliary chamber 23, the second sub fuel injector 52 injects the fuel into the auxiliary chamber 23.

The ECU 50 controls a fuel-injection rate between the first sub fuel injector 152 and the second sub fuel injector 52, whereby a swirl intensity of the air in the auxiliary chamber 23 is adjusted. Therefore, according to the operational state of the internal combustion engine 10, the vortex breakdown of the flame jet and a spread velocity of the flame jet in the main combustion chamber 15 can be controlled.

The above-mentioned embodiment may be modified as follows. The same parts and components as those in the above embodiment are indicated with the same reference numerals and the same descriptions will not be reiterated.

Figure 10:
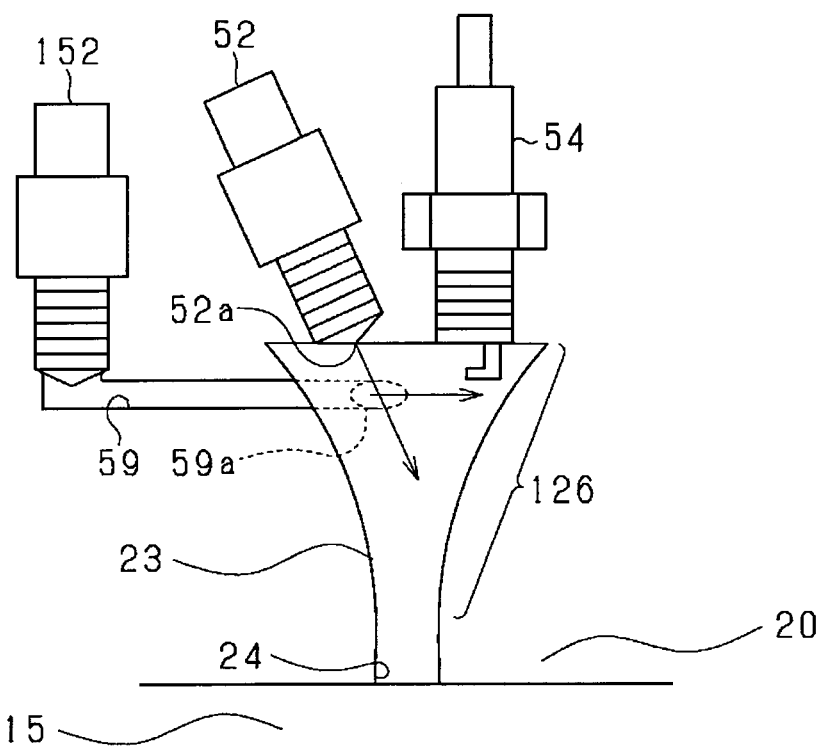
FIG. 10 is a schematic chart showing a modification of the auxiliary chamber.

As shown in FIG. 10, the auxiliary chamber 23 can be defined only by the circular cone portion 126 without the cylindrical portion. The passage sectional area of the circular cone portion 126 is gradually decreased toward the injection port 24. Since no vane is formed on the circular cone portion 126, the gas flowing into the auxiliary chamber 23 from the main combustion chamber 15 is not swirled. Therefore, the angle θ between the inner surface of the injection port 24 and the inner surface of the circular cone portion 26 may be about 12° or less. The angle θ is defined in such a manner that the air flowing into the auxiliary chamber 23 from the main combustion chamber 15 does not separate from the inner surface of the circular cone portion 126 during a compression stroke of the engine 10.

In FIG. 8, a plurality of vanes may be provided on the circular cone portion 26. Therefore, the flame jet flowing into the main combustion chamber 15 from the auxiliary chamber 23 is surely swirled by the vanes, the first sub fuel injector 152 and the injection passage 59.

The fuel-injection rate between the first sub fuel injector 152 and the second sub fuel injector 52 can also be set constant. Even in this case, the air in the auxiliary chamber 23 is swirled by the fuel injected by the first sub fuel injector 152.

The above-mentioned embodiments may be modified as follows. The same parts and components as those in the above embodiments are indicated with the same reference numerals and the same descriptions will not be reiterated.

A sectional shape of the injection port 24 can also be changed into an ellipse form. However, it is preferable that the sectional shape of the injection port 24 is circular so that the swirl of the flame jet is not weakened. Moreover, the passage sectional area of an injection port 24 can be set in a range in which the swirl of the flame jet is not weakened.

Figure 11:
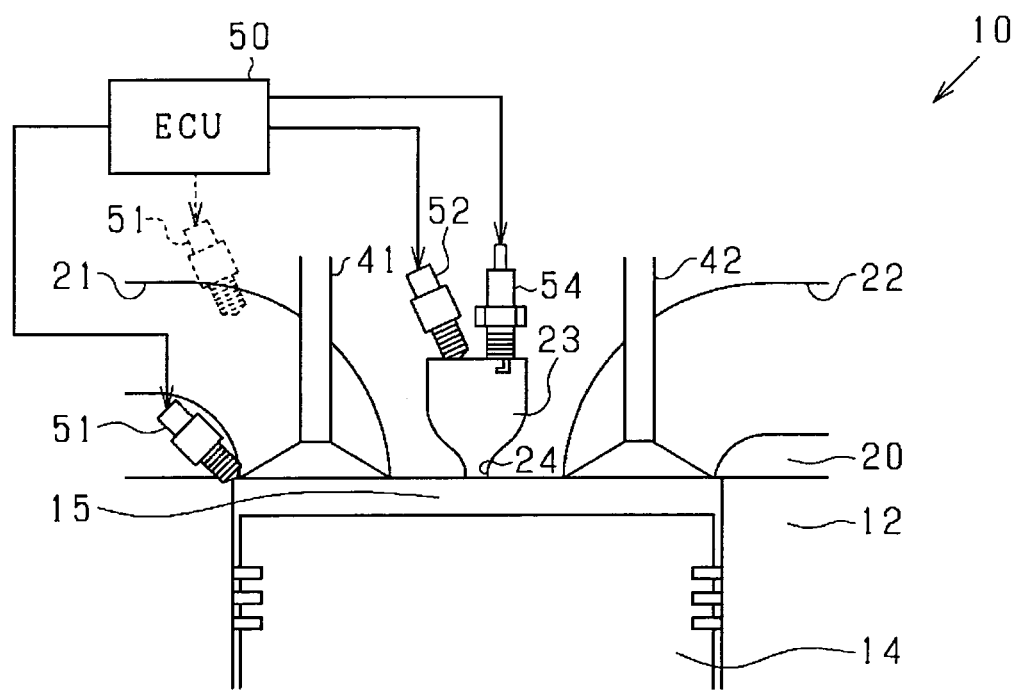
FIG. 11 is a schematic chart showing a modification of a main fuel injector and a piston.

As shown in FIG. 11, the piston 14 may have no cavity on its top surface. Moreover, the main fuel injector 51 may be provided to the cylinder head 20 in such a manner as to confront an outer periphery of the main combustion chamber 15. That is, the main fuel injector 51 injects the fuel into a side portion of the main combustion chamber 15. It should be noted that the volume of the main combustion chamber 15 in FIG. 1 and the volume of the main combustion chamber 15 in FIG. 11 are substantially equal to each other.

As shown by a dashed line in FIG. 11, the main fuel injector 51 may be provided to the cylinder head 20 to inject the fuel into the intake port 21.

Above embodiments can be applied not only the auxiliary chamber type internal combustion engine using fuel gas but also an auxiliary chamber type diesel engine and an auxiliary chamber type gasoline engine.

What is claimed is:

1. An auxiliary chamber type internal combustion engine, comprising:
    a main combustion chamber;
    an auxiliary chamber having an injection port through which the main combustion chamber communicates, the auxiliary chamber having a passage sectional area which is smoothly decreased toward the injection port;
    a fuel injection valve injecting a fuel into the auxiliary chamber;
    an ignition plug igniting the fuel in the auxiliary chamber; and
    a swirl generating portion disposed on an inner surface of the auxiliary chamber from which a gas flowing from the main combustion chamber to the auxiliary chamber separates, wherein
    the swirl generating portion extends spirally in such a manner as to swirl only the gas flowing into the auxiliary chamber from the combustion chamber, and to swirl no gas flowing from the main combustion chamber to the auxiliary chamber.

2. An auxiliary chamber type internal combustion engine, according to claim 1, further comprising:
    a piston having a cavity at a position confronting the injection port.

3. An auxiliary chamber type internal combustion engine, according to claim 1, wherein
    the ignition plug has a grounding electrode which extends from a specified position to a center of the ignition plug, and
    the ignition plug is arranged in such a manner that a distance between an injection nozzle of a sub fuel injector and the specified position becomes longest.

4. An auxiliary chamber type internal combustion engine, according to claim 1, wherein:
    the auxiliary chamber includes a cylindrical portion and circular cone portion, and
    the circular cone portion is connected to the injection port.

5. An auxiliary chamber type internal combustion engine, according to claim 4, wherein:
    the swirl generating portion in disposed on an inner surface of the circular cone portion of the auxiliary chamber.

* * * * *